United States Patent
Guidetti et al.

(10) Patent No.: US 11,499,103 B2
(45) Date of Patent: **\*Nov. 15, 2022**

(54) PROCESS FOR THE HYDROCONVERSION OF HEAVY OIL PRODUCTS WITH RECYCLING

(71) Applicant: ENI S.P.A., Rome (IT)

(72) Inventors: Stefania Guidetti, San Donato Milanese (IT); Alberto Malandrino, San Donato Milanese (IT); Simone Cattaneo, San Donato Milanese (IT)

(73) Assignee: ENI S.P.A., Rome (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/279,357

(22) PCT Filed: Sep. 24, 2019

(86) PCT No.: PCT/IB2019/058084
§ 371 (c)(1),
(2) Date: Mar. 24, 2021

(87) PCT Pub. No.: WO2020/065522
PCT Pub. Date: Apr. 2, 2020

(65) Prior Publication Data
US 2021/0395623 A1 Dec. 23, 2021

(30) Foreign Application Priority Data
Sep. 25, 2018 (IT) .................. 102018000008890

(51) Int. Cl.
*C10G 67/02* (2006.01)
*B01D 3/10* (2006.01)
(Continued)

(52) U.S. Cl.
CPC .............. *C10G 67/02* (2013.01); *B01D 3/10* (2013.01); *B01D 3/143* (2013.01);
(Continued)

(58) Field of Classification Search
None
See application file for complete search history.

(56) References Cited

U.S. PATENT DOCUMENTS

| 4,334,976 A | 6/1982 | Yan |
| 4,521,295 A | 6/1985 | Chervenak et al. |

(Continued)

FOREIGN PATENT DOCUMENTS

| CN | 1729275 A | 2/2006 |
| CN | 101068908 A | 11/2007 |

(Continued)

OTHER PUBLICATIONS

International Search Report dated Nov. 7, 2019 re: Application No. PCT/IB2019/058084, pp. 1-4, citing: WO 2014/025561 A1, U.S. Pat. No. 4,521,295 A, US 2013/081976 A1, US 2016/053184 A1 and U.S. Pat. No. 4,334,976 A.

(Continued)

*Primary Examiner* — Tam M Nguyen
(74) *Attorney, Agent, or Firm* — Cantor Colburn LLP

(57) ABSTRACT

A process for the hydroconversion of heavy oil products includes the following steps where heavy oil products and hydrogen are supplied to a slurry hydroconversion section having a molybdenum-based catalyst: separating the reaction effluent into a vapour phase and a slurry phase; and sending the slurry phase to a separation section having the function of separating the Vacuum Gas Oil, Heavy Vacuum Gas Oil, Light Vacuum Gas Oil, and Atmospheric Gas Oil fractions, from a stream of heavy organic products which contains asphaltenes, unconverted feed, catalyst, and solid (Continued)

formed during the hydroconversion reaction. This stream is partly sent to the reaction section and partly forms a purge stream, which is heated and made fluid between 185° C.-220° C., and subjected to a static settling unit up to at least 100° C. From the settling unit two new products, clarified component and cake, are obtained. The clarified component is recycled to the hydroconversion reaction section.

17 Claims, 2 Drawing Sheets

(51) Int. Cl.
*B01D 3/14* (2006.01)
*B01D 17/02* (2006.01)
(52) U.S. Cl.
CPC . *B01D 17/0214* (2013.01); *C10G 2300/1077* (2013.01); *C10G 2300/202* (2013.01); *C10G 2300/205* (2013.01); *C10G 2300/4006* (2013.01); *C10G 2300/4012* (2013.01); *C10G 2300/4081* (2013.01); *C10G 2300/706* (2013.01)

(56) References Cited

U.S. PATENT DOCUMENTS

| | | | |
|---|---|---|---|
| 7,790,646 B2 | 9/2010 | Lopez et al. | |
| 8,110,090 B2* | 2/2012 | Zimmerman | C10G 67/049 208/45 |
| 8,697,594 B2* | 4/2014 | Nguyen | C10G 49/12 502/223 |
| 2006/0272982 A1* | 12/2006 | Montanari | C10G 67/049 208/86 |
| 2010/0122938 A1 | 5/2010 | Abulnaga et al. | |
| 2011/0017636 A1* | 1/2011 | Nguyen | C10G 47/02 208/78 |
| 2013/0081976 A1 | 4/2013 | Heraud et al. | |
| 2013/0081977 A1* | 4/2013 | Woo | B01J 37/20 208/213 |
| 2013/0247406 A1 | 9/2013 | Odueyungbo | |
| 2016/0053184 A1 | 2/2016 | Wheeler et al. | |
| 2017/0128929 A1* | 5/2017 | Kumar | C10G 47/26 |
| 2019/0062655 A1* | 2/2019 | Housmans | C10G 69/02 |
| 2020/0115643 A1* | 4/2020 | Rueter | C10G 1/06 |
| 2021/0371762 A1* | 12/2021 | Mountainland | B01J 8/228 |
| 2022/0041937 A1* | 2/2022 | Balducci | C10G 1/086 |

FOREIGN PATENT DOCUMENTS

| | | |
|---|---|---|
| EP | 2440635 A2 | 4/2012 |
| WO | 2008141830 A1 | 11/2008 |
| WO | 2008141831 A1 | 11/2008 |
| WO | 2009070778 A2 | 6/2009 |
| WO | 2010142397 A2 | 12/2010 |
| WO | 2014025561 A1 | 2/2014 |
| WO | 2016103199 A1 | 6/2016 |
| WO | 2017109728 A1 | 6/2017 |
| WO | 2018078555 A1 | 5/2018 |

OTHER PUBLICATIONS

Written Opinion dated Nov. 7, 2019 re: Application No. PCT/IB2019/058084, pp. 1-6, citing: WO 2014/025561 A1, U.S. Pat. No. 4,521,295 A, US 2013/081976 A1, US 2016/053184 A1 and U.S. Pat. No. 4,334,976 A.
CN Office Action dated Mar. 17, 2022 re: Application No. 201980063233.7, pp. 1-11, citing: WO2014025561A1, U.S. Pat. No. 4,521,295A, US20013081976A1, US2016053184A1, U.S. Pat. No. 4,337,976A, CN1729275A, CN101068908A and WO2017109728A1.

* cited by examiner

PROCESS FOR THE HYDROCONVERSION OF HEAVY OIL PRODUCTS WITH RECYCLING

TECHNICAL FIELD

The present disclosure relates to a process for the hydroconversion of heavy oil products by slurry technology from which, after several operations, a heavy slurry phase is formed which is partly recycled to a reactor and partly separated as a purge. Said purge is treated by static decantation forming a stream of clarified component which is recycled to a hydroconversion reactor.

Said purge stream is currently sent to the battery limits and constitutes a percentage that varies from 6% to 8% with respect to the fresh feed, that is allowing a process conversion that varies from 92% to 94% to be reached. This purge stream contains unconverted feed, catalyst metals, catalyst and carbonaceous residues. It is therefore clear how important for the purposes of improving the production efficiency and the conversion of the hydroconversion process is the valorisation of the purge by trying to recover the catalyst metals, the same catalyst and the unconverted purge. It is also important to try to reduce the amount of purge that is sent to the battery limits, thus simplifying the management of the purge section.

SUMMARY

The hydroconversion process object of the disclosure is applicable to all those industrial contexts in which heavy oil products need to be valorised with also a recovery in efficiency and conversion, such as refineries or petrochemical industrial sites in general.

In the disclosure, heavy oil products mean crude oils, heavy crudes, bitumens from tar sands, distillation residues, heavy distillation cuts, deasphalting residues, synthetic oils products deriving from the Fischer-Tropsch process, vegetable oils, coke-derived oils and oil shale, oils obtained by thermal decomposition of waste, polymers, biomasses.

In the disclosure, slurry phase means a mixture of liquid and solid.

In the disclosure, the term "purge" means slurry-phase organic streams which contain an amount of hydrocarbons having a boiling point greater than or equal to 540° C. greater than 65% by weight, an amount of asphaltenes greater than or equal to 20% by weight and characterized by the presence of solids contents greater than or equal to 4% by weight, the remainder being hydrocarbons having a boiling point comprised between 350° C. and 500° C. Purge solids contain carbonaceous residues and metal compounds which may contain sulphides of transition metals, such as for example molybdenum, iron, nickel and vanadium, and having sub-millimetre sizes.

For the purposes of the present discussion, the term "solid" means the fraction that is insoluble in tetrahydrofuran, indicated in this text by the acronym THF-i.

For the purposes of this discussion, the term "asphaltenes" means the organic fraction that is soluble in tetrahydrofuran but insoluble in n-pentane.

Asphaltenes are classified based on their insolubility in n-paraffins (typically having from 5 to 7 carbon atoms C5-C7). Such compounds are generally constituted by nuclei of aromatic polycondensates variously branched and joined together through linear chains. Such compounds may contain heteroatoms (S, N) therein which give them their polar nature.

In the disclosure, the term "cake" means a solid material at room temperature with vitreous characteristics (that is the appearance of the cake has the characteristics of the glass) which make it easily grindable and consequently transportable even for long stretches without making a particular thermostatic control necessary. This characteristic remains at temperatures that vary in the range comprised between 50° C. and 60° C.

The cake is hard at room temperature with a softening point comprised between 80° C. and 100° C. and a degree of penetration from 2 dmm to 5 dmm (dmm indicates decimillimeters). The softening point is the temperature at which the solid cake becomes soft and indicates the dependence of the consistency of the cake on the temperature. The degree of penetration is measured according to the ASTM-D5-06 method and expresses in decimillimeters the penetration applied to the material, at room temperature, by a needle of known weight.

The consistency of the cake is due to the presence of solids (THFi) in greater concentration than the other streams and the presence of asphaltenic compounds.

The cake contains solids as previously defined in the text of the disclosure.

The solids of the cake contain carbonaceous residues and metal compounds which may contain transition metal sulphides, such as for example molybdenum, iron, nickel and vanadium, and having sub-millimetre sizes.

In the disclosure, the term maltenes means the set of those compounds that are soluble both in Tetrahydrofuran and in n-pentane.

In the disclosure, all the operating conditions reported in the text must be understood as preferred conditions even if not expressly declared.

For the purposes of the present discussion the term "to understand" or "to include" also comprises the term "to consist in" or "essentially consisting of". For the purposes of this discussion the definitions of the ranges always comprise the ends unless otherwise specified.

The hydroconversion of heavy oil products can be carried out by adopting different process schemes. The hydroconversion reactor can traditionally be with a fixed bed, an ebullated bed or of the slurry type. In a slurry reactor the catalyst is dispersed in the reaction medium and uniformly distributed inside the reactor itself.

A possible configuration of the process for the hydroconversion of heavy oil products consists in the Eni Slurry Technology, owned by Eni and known by the acronym EST.

This configuration provides for a hydroconversion section in which the reactors are fed with a molybdenum-based catalyst of such sizes as to be completely dispersed in the reaction medium, so as to be able to operate in the slurry phase. The reaction produces a head effluent which is subsequently sent to a high pressure and high temperature (HP/HT) phase separator.

The vapour phase exiting the HP/HT separator is sent to a section from which naphtha, atmospheric gas oil (AGO), vacuum gas oil (VGO) and gaseous stream rich in hydrogen, which contains C1-C4 gas, are recovered by condensation and which is recycled to the hydroconversion section, except for a gaseous sample which can be introduced in the reaction effluent.

The bottom stream exiting the HP/HT separator is in a slurry phase and is sent to a separation section which typically comprises a series of decreasing pressure and temperature devices—such as a medium pressure separator, an atmospheric distillation column and a column vacuum distillation—with the aim of separating the VGO from the heavier products. The heavy bottom products contain an unconverted feed, catalyst and solid formed during the reaction. A part of said heavy products is recycled to the reaction section and the remainder is moved away from the process as a purge stream.

The reaction products of an EST process can also be obtained exclusively in the vapour phase, as occurs in the EST Vapor Phase Outflow process (EST-VPO), described in several patent applications according to the progressive development of the technology. The applicant summarizes below in a synthetic manner the patent applications that apply the EST-VPO technology.

WO 2008/141830 describes a process for the hydroconversion of heavy oils, wherein the reaction takes place in a bubble-type solids accumulation reactor able to accumulate at least 50 kg/m$^3$, supplied by hydrogen or by a mixture of hydrogen and hydrogen sulphide, in which the hydrogen has a weight ratio, with respect to the feed, of at least 0.3. The molybdenum concentration used as a catalyst is at least 5 kg per each m$^3$ of feed.

WO 2008/141831 describes a system for the hydroconversion of heavy oils which consists in a solids accumulation reactor and a stripping section outside or inside the reactor. When the stripping section is inside, the reactor can be completely or partially filled and the stripping section can be positioned in the upper part of the reactor or downstream of a duct inside the reactor. When the stripping section is outside, the reactor—completely filled—provides a circuit for the forced recirculation of the liquid phase to the reactor itself. It is also possible that downstream of the reactor there is a liquid-vapour separator. WO 2016/103199 describes a system for the hydroconversion of heavy oils comprising a reactor, a liquid-vapour separator and a stripping section of the conversion products outside the reactor. The stripping gas is injected directly into the reaction effluent through a conduit for the injection of the stripping gases, positioned at a point of the connection conduit between the reactor head and the liquid-vapour separator, said connection conduit being inclined, at least starting from the injection point, upwards with a slope between 2% and 20%, with respect to a horizontal plane. The conduit for the injection of the stripping gases is inclined with respect to the axis of the connection conduit between the reactor head and the liquid-vapour separator at an angle comprised between 20° and 65°. The flow of the gaseous stripping stream which is injected into the connection conduit between the reactor head and the separator has a direction from the top downwards. After stripping the effluent is sent to an HP/HT phase separator to separate the liquid phase also containing a small amount of solids (those formed during the reaction and the dispersed catalyst) which is recycled to the reactor and a vapour phase containing the reaction products. WO 2018/078555 describes a process for the hydroconversion of heavy oil products which are reacted in a hydroconversion reactor, together with a recycling containing hydrogenating gas and in the presence of a suitable catalyst producing a two-phase effluent.

The reaction effluent is supplied to a high pressure and high temperature stripping step, which operates at the reaction pressure, using as a stripping gas a stream having the same composition as the gas supplied to the reactor; and thus producing a vapour-phase stream and a slurry-phase stream containing the heavy products and the solids. The slurry is partly recirculated to the hydroconversion section, and partly taken continuously, forming a purge stream.

There are several methods developed for the treatment of the purge with the aim of recovering the components that can be valorised, such as for example the catalyst metals WO 2014/025561 describes a process for the recovery of a catalyst by hydro-cracking from an effluent coming from a hydro-cracking slurry zone. Said process provides for the effluent to be separated into a first stream containing solvent and a clarified component (pitch), and into a second stream which contains pitch and catalyst.

The separation can take place by centrifugation, filtration, decantation or electrostatic separation. The second stream is treated by leaching with acid so as to extract the catalyst and form an aqueous solution and a residue. The aqueous solution is then treated with anions to form an insoluble salt, the catalyst, and a further aqueous solution. US 2013/0247406 describes an integrated process which comprises:

a process to valorise heavy crude oils to convert them into lighter products in the presence of a catalyst;

a deoiling process in which heavy residues and heavier products deriving from the treatment of heavy crude oils are separated from the spent catalyst which will be subsequently recovered;

a synthesis zone of the catalyst.

The separation of the catalyst takes place by treatment with filtration technologies on membranes, and a subsequent stage of thermal devolatilization.

WO 2009/070778 describes a method for the recovery of metals of a spent catalyst used in a slurry process for the valorisation of heavy oils. According to WO 2009/070778 the phase containing the spent catalyst is subjected to pyrolysis and the pyrolysis residue is put in contact with a leaching solution containing ammonia and with air, to dissolve the metals of the VIB and VIII groups, and form a pressurized slurry. Said slurry contains at least one soluble metal complex of the VIB and VIII group, ammonium sulphate and a solid residue containing at least one metal complex of the VB group and coke.

Subsequently the solid residue containing ammonium metavanadate and coke from the pressurized slurry is separated and removed. A portion of the group VIII metals is precipitated. The precipitation is carried out at a predetermined pH to selectively precipitate a portion of the metal complexes of the VIB and VIII groups.

US 2010/0122938 concerns a process for separating ultrafine hydro-cracking solid catalysts from a liquid slurry of hydrocarbons, said solids present in an amount comprised between 5% and 40% by weight. The process envisages the following stages:

cooling a slurry stream containing hydrocarbons and solids, preferably at a temperature that varies from 55° C. to 75° C.;

mixing said stream cooled with a solvent in a solvent/slurry weight ratio that varies from 3:1 to 1:3, to form a first mixture containing liquid hydrocarbons, solvent and a stream containing the heavy hydrocarbon which encapsulates the catalyst solid;

separating the first mixture in a first centrifuge to form a second mixture containing a low concentration of heavy hydrocarbon that encapsulates the catalyst solid, and a third mixture containing heavy hydrocarbon that encapsulates the catalyst solid;

separating the second mixture in at least a second centrifuge to form a fourth mixture that contains solvent and liquid hydrocarbons, and a fifth mixture containing a significant concentration of heavy hydrocarbon which encapsulates the catalyst solid;

mixing the third mixture and the fifth mixture forming a
final mixture;
drying the final mixture to form a mixture of hydrocarbons with vapour-phase impurities and a coke-type solid residue;
separating the impurities from the hydrocarbons and recovering the solid residue.

U.S. Pat. No. 7,790,646 describes a process for converting fine catalysts, present in amounts between 5 and 40% by weight, and contained in a slurry stream together with heavy oils in coke-type materials, from which the metals of the catalyst are then recovered. The process consists in the following steps:
mixing a slurry containing heavy oils and a spent catalyst containing metal sulphides of the VIII and VI groups, with a solvent, preferably in a volumetric ratio comprised between 0.5/1 and 5/1, preferably at a temperature that varies from 25° C. at 80° C. thus making the asphaltenes precipitate;
separating, preferably by decantation and/or centrifugation, the spent catalyst and the asphaltenes precipitated by the heavy oils and by the solvent;
converting the precipitated asphaltenes into coke-type material containing metals that will be recovered by thermal pyrolysis.

EP 2440635 describes a process for recovering metals from stream rich in hydrocarbons and carbonaceous residues which comprises the following stages:
sending said stream to a primary treatment, carried out in one or more stages, in which said stream is treated in the presence of a fluxing agent in a suitable apparatus, at a temperature that varies from 80° C. to 180° C. and subjected to a liquid/solid separation to obtain a clarified component which consists in liquids and a cake;
optionally subjecting said separated cake to drying to remove the hydrocarbon component which has a lower boiling point at a temperature that varies from 300° C. to 350° C. from a cake;
sending said cake, optionally dried, to a secondary heat treatment which comprises:
a flame-free pyrolysis at a temperature comprised between 400° C. and 800° C.;
an oxidation of the pyrolysis residue carried out under oxidation conditions and at a temperature comprised between 400° C. and 800° C.

The patent application US 2010/0326887 describes the separation of a non-sticky pitch from a hydrocarbon slurry, by means of a distillation treatment which brings the Vacuum Gas Oil (VGO) content in the final product below 14% by weight. The solids are concentrated on the bottom of the pitch forming column.

WO 2017/109728 describes a process for the treatment of refinery purge streams which comprises the following steps:
taking a refinery purge stream containing a slurry-phase hydrocarbon component having a boiling point greater than or equal to 140° C., characterized by the presence of amounts of asphaltenes greater than or equal to 5% by weight and characterized by the presence of solids content greater than or equal to 5% by weight;
mixing, at a temperature greater than or equal to 100° C., said purge with a mixture of hydrocarbons or fluxing agent, whose total content of aromatic compounds is comprised between 50% and 70% by weight, and has an initial boiling point equal to or greater than the temperature at which mixing is carried out, so as to form a suspension with a content greater than or equal to 10% by weight of compounds having a boiling point $T_{bp}$ lower than or equal to 350° C.;
sending said suspension to a liquid-solid separation stage, which operates at a temperature greater than or equal to 100° C., separating a solid phase containing a residual organic component and a solid component, cake, and a liquid phase containing residual solids;
cooling the solid phase thus obtained below 60° C., and storing it while keeping it at a temperature lower than or equal to 60° C.

In said process the weight ratio between purge and fluxing agent varies between 1:0.5 and 1:4, and the average residence time of the mixture during mixing and before the liquid-solid separation is lower than or equal to 12 hours.

As previously stated, the purge stream constitutes a value comprised between 6% and 8% of the fresh feed, so that the total conversion that can be obtained under normal operating conditions varies from 92% to 94%.

The current technical solutions for the purge treatment allow reducing the purge to a percentage comprised between 2% and 3% with a considerable simplification of the management of the purge section. Furthermore, as previously stated, the purge contains unconverted feed, catalyst metals, catalyst and carbonaceous residues. It is therefore clear how important for the purposes of improving the production efficiency and the conversion of the hydroconversion process of heavy oil products is the valorisation of the purge by trying to recover the catalyst metals, the same catalyst and the unconverted feed.

For this purpose, the Applicant has found a process for the hydroconversion of heavy oil products which integrates a hydroconversion section with a purge treatment section by a recycle stream.

Said process comprises the following steps:
Supplying to a slurry-phase hydroconversion section a Molybdenum-containing catalyst precursor, heavy oil products (the feed) and a hydrogen-containing stream;
Conducting a hydroconversion reaction producing a reaction effluent which is subsequently separated at high pressure and high temperature into a vapour phase and a slurry phase;
Subsequently sending the separated vapour phase to a gas treatment section with the function of separating a liquid fraction from the hydrogen-containing gas;
Subsequently sending the slurry phase to a separation section which has the function of separating the Vacuum Gas Oil (VGO), Heavy Vacuum Gas Oil (HVGO), Light Vacuum Gas Oil (LVGO), Atmospheric Gas Oil (AGO) fractions, from a stream of heavy organic products which contains asphaltenes, unconverted feed, catalyst and solid formed during the hydroconversion reaction;
Recycling a part of said heavy organic products to the reaction section and forming a purge stream with the remainder;
Heating said purge stream at a temperature greater than or equal to 185° C. and not above 220° C. and, subsequently;
Subjecting said heated purge to settling by lowering the temperature in a progressive and controlled manner up to the minimum temperature of 100° C., without shaking the purge, so as to form a light phase, called clarified component, and a heavy phase, called cake, as a function of density;
Recycling the clarified component to the slurry-phase hydroconversion section.

Advantageously with the described and claimed process it is possible to reduce the cake to a value comprised between 2% and 6% with respect to the fresh feed, and thus increase the total conversion that can be obtained under normal operating conditions up to values that vary from 94% to 98%. The clarified component, being a product deriving from a separation unit downstream of a hydrovconversion process, contains low reactive asphaltenes with respect to the fresh feed. Therefore, the recycle of the clarified component to the slurry hydroconversion section, increases the amount of low reactive asphaltenes entering the hydroconversion section. If this section is already sized, this recycle results in a reduction of the plant capacity, that is a reduction of the fresh feed to the hydroconversion section and an increase in the hydrogen consumption.

In order to be able to convert this extra fraction of low reactive asphaltenes, recovering the plant capacity and with the already sized hydroconversion section, it is necessary to slightly modify the operating conditions by increasing the reaction temperature. If instead it is possible to change the volumes of the hydroconversion reaction section, it is sufficient to consider the recycle of the clarified stream and its reactivity in the slurry phase in the sizing.

BRIEF DESCRIPTION OF THE DRAWINGS

Further purposes and advantages of the present disclosure will become more apparent from the following description and the appended figures, which are provided purely by way of a non-limiting example, which represent preferred embodiments of the disclosure.

Figure 1:
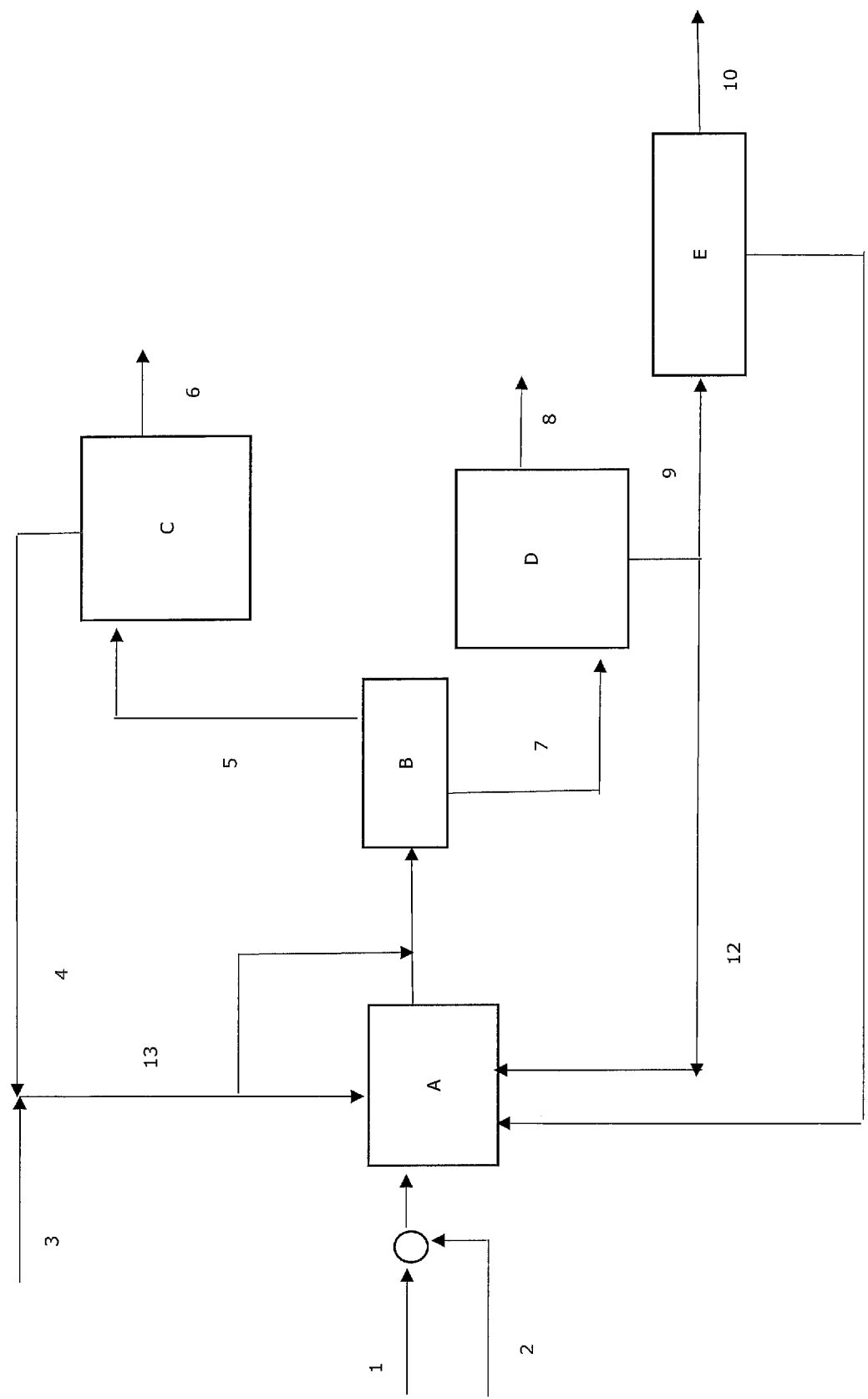
FIG. 1 illustrates a preferred embodiment of the process according to the present disclosure, in which the fresh feed (1) is supplied together with the catalyst precursors (2) in a hydroconversion reactor (A). The reaction effluent is supplied to a high pressure and temperature separator (B) which forms a gaseous stream (5) and a slurry (7). The gas (5) is supplied to the treatment section (C) where a gaseous stream containing hydrogen (4) is separated from naphtha, atmospheric gas oil (AGO) and Vacuum Gas Oil (VGO) indicated with 6.

The slurry (7) is supplied to a vacuum separation section (D) to separate Vacuum Gas Oil (VGO) from a heavy product which partly recycles to the reactor (12) and partly forms a purge stream (9). The purge is subjected to settling (E) where a cake (10) is separated from a clarified component (11) which is recycled to the reactor (A).

FIG. 1 also indicates a saturation gas (13) cut from the gaseous recycling which is supplied onto the bottom of the high pressure and temperature separator (B).

Figure 2:
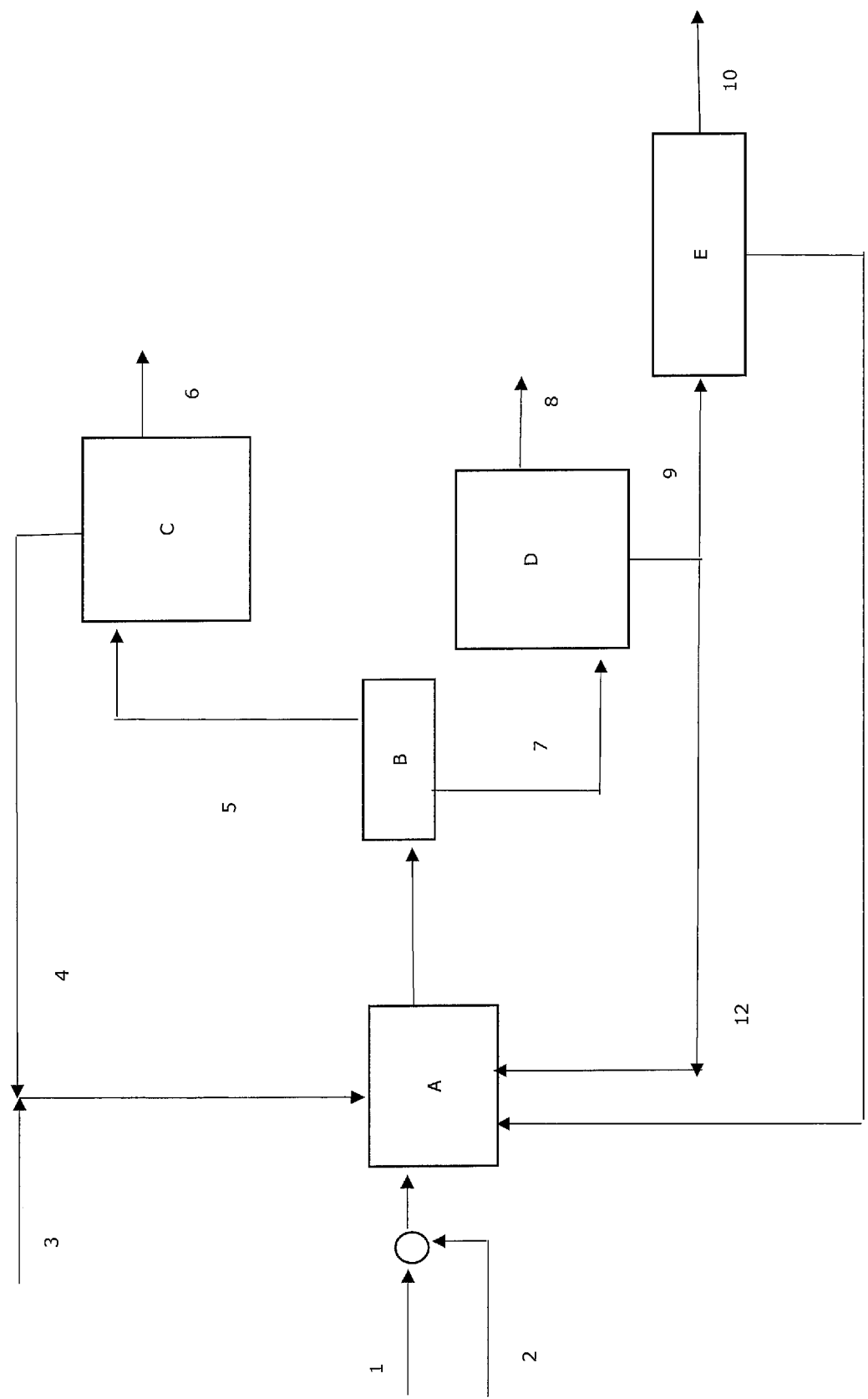

FIG. 2 is substantially identical to FIG. 1 and does not provide for the saturation gas.

DETAILED DESCRIPTION OF THE DRAWINGS

The process for the hydroconversion of heavy oil products is now described in detail, also with reference to FIG. 1, which integrates a hydroconversion section with a purge treatment section through separation by static decantation obtaining a recycle stream.

Precursors of a catalyst based on Molybdenum (2), heavy oil products (the feed, 1) and a hydrogen-containing stream (3,4) are supplied to a slurry-phase hydroconversion reactor (A) in which they are converted, producing a reaction effluent which is subsequently separated in a high pressure and high temperature separator (B) into a vapour phase (5) and a slurry phase (7).

Preferably, the slurry-phase hydroconversion reactor is a bubble column. One or more hydroconversion reactors placed in parallel can be used; similarly, one or more high pressure and high temperature separators placed in parallel can be used.

Preferably a part of the hydrogen-containing recycle gas (13) is supplied to the high pressure and high temperature separator.

The separated vapour phase is subsequently supplied to a gas treatment section which has the function of separating a liquid fraction from the hydrogen-containing gas.

The vapour treatment section operates at gradually decreasing pressure and temperature.

Said section can comprise heat exchangers alternated with a washing column which uses VGO as a solvent, a high pressure and medium temperature separator, a high pressure and low temperature separator.

From the vapour treatment section, naphtha, atmospheric gas oil (AGO), vacuum gas oil (VGO) and gaseous stream rich in hydrogen are recovered, which contains hydrocarbon gases having from 1 to 4 carbon atoms, and which is recycled to the hydroconversion section (4), except for a gaseous sample that can be supplied into the high pressure and high temperature separator (B).

The slurry phase (7) is subsequently sent to a liquids separation section (D) which has the function of separating the Vacuum Gas Oil (VGO, 8) from a stream of heavy products which contain unconverted feed, metal sulphides, catalyst and solid formed during the hydroconversion reaction. Said liquids separation section can preferably comprise a series of decreasing pressure and temperature devices. In a first passage the slurry is supplied to a high temperature and low pressure separator which works as an accumulator; in a second passage the separated vapour phase is supplied into a pre-flash column, eventually the bottom stream is supplied to a stripper to separate the lights, and finally in a third passage the enriched stream exiting the stripper is supplied to a vacuum distillation column; alternatively, the stripper is not present and the bottom stream is supplied to a vacuum distillation column. From the vacuum column the Vacuum Gas Oil (VGO) fraction, the Light Vacuum Gas Oil (LVGO) fraction, the Heavy Vacuum Gas Oil (HVGO) fraction, the Wash Oil and the vacuum Residue are recovered. The Vacuum residue exits from the bottom of the vacuum column and is rich in asphaltenes, solids, metals and catalysts and forms a stream of heavy products.

A part of the heavy products is recycled to the reaction section (12), while the remainder forms a purge stream (9).

The purge is then heated at a temperature greater than or equal to 185° C. and not above 220° C., preferably between 200 and 220° C.

Subsequently the purge is subjected to settling by lowering the temperature in a progressive and controlled manner up to the minimum temperature of 100° C., preferably comprised between 100° C. and 170° C., more preferably comprised between 100° C. and 160° C. The lowering of the temperature in a controlled manner can take place in different ways:

by using an adequately sized and thermostated tank, for example a hot-oil thermostat, or by mixing the warm stream to be decanted, for example the heated purge, with a cold stream, for example the clarified component which can be at a temperature that varies from 200° C. to 80° C., considering the appropriate thermal balance of the system to calculate the flow rates thereof.

The lowering of the temperature is of a value that varies from 3° C. per minute to 10° C. per minute, preferably from 5° C. per minute to 10° C. per minute, more preferably 10° C. per minute.

During the static settling, the temperature must be such as to make the asphaltenes insoluble and at the same time make the clarified component movable allowing for its extraction.

In the temperature range comprised between 100° C. and 160° C. the separation of the dense phase is optimal.

During the settling phase the purge is not shaken. The settling forms a light phase, called clarified component, and a heavy phase, called cake, as a function of density.

The clarified component is recycled to the slurry-phase hydroconversion section.

The weight ratio between the clarified component and the fresh feed can vary in the range from 2% to 13%, preferably from 3% to 10% by weight.

The time required for the formation of a heavy phase or cake can vary from preferably 15 minutes to 2 hours, more preferably it varies between 20 minutes and 1 hour. The settling rate is preferably comprised between 85 mm/hour and 300 mm/hour.

The cake produced is "glassy" at room temperature with a softening point that can vary from 80° C. to 100° C. and penetration 2 dmm.

The consistency of the cake is due to the presence of solids (THFi) in greater concentration than the other streams and the presence of asphaltenic compounds.

The catalyst is generated "in situ" by an oil soluble Mo-containing precursor, supplied to the hydroconversion liquid-phase reactor directly with the feed. The normally used precursor is a solution of Mo-octoate (2-ethylhexanoate) in 2-ethylhexanoic acid, containing 15.5% by weight of Mo.

The catalyst precursor is liquid and reacts with the sulphide coming from the feed and the hydrogen present in the reactor forming $MoS_2$ (solid molybdenite finely dispersed in the liquid phase) in lamellas.

The hydroconversion reactors can operate in a temperature range comprised between 420° C. to 440° C., at a pressure comprised between 155 atm and 160 atm. The high pressure and high temperature separators operate under the same operating conditions as the hydroconversion reactors, except for the load losses and the heat losses along the line that connects the reactors to the separators.

Some application examples of the present disclosure are now described which have a purely descriptive and non-limiting purpose and which represent preferred embodiments.

EXAMPLES

The following examples are the result of process calculations, wherein the hydroconversion process envisages the presence of a settler. The hydroconversion process is sized so as to provide the results of example 1. In all cases wherein the settler is present, the process conversion increases, as the flow rate to be sent to the battery limits decreases.

Comparative Example 1

160.2 t/h of vacuum column residue and 6.4 t/h of make-up hydrogen (which takes into account not only the effective consumption of hydrogen but also the losses in the various points of the plant) are supplied to a hydroconversion reactor at a temperature of 426.8° C. and at pressure of 160 bara; the catalyst used is molybdenum octoate, containing 15.5% of molybdenum; the catalyst flow rate was 190.4 kg/h.

The process does not envisage the settling of the purge, which is therefore sent to the battery limits. Since there is no settling process, neither clarified component nor cake are produced. Therefore, the recycling of clarified component is not envisaged.

The total conversion is calculated according to Equation 1:

$$\text{Total conversion}(\% \text{ weight}) = (100 - \% \text{ purge weight}).$$

The results are reported in Table 1.

Example 1

160.2 t/h of vacuum residue are supplied to a hydroconversion reactor at a temperature of 426.8° C. and at pressure of 160 bara. The catalyst is always the same as in the comparative example 1 and its flow rate is 190.4 kg/h; also the hydrogen has the same flow rate as the comparative example 1 (6.4 t/h).

In this case the separation process via static settling is applied to the purge stream. Therefore, the purge stream is totally sent to the settler which acts in such a manner that a clarified component stream and a cake stream are obtained. In this case the clarified component recycle is not considered, that is both the cake stream and the clarified component are sent to the battery limits. The settling process considers a yield of the cake from 35% to 40% and a yield of the clarified component from 60% to 65%.

The total conversion is calculated according to Equation 2:

$$\text{Total conversion}(\% \text{ weight}) = (100 - (\% \text{ clarified component weight} + \% \text{ Cake weight})),$$

both of them being considered as being sent to the battery limits.

In this case the yields of the products in cuts (calculated as kg/h of each cut exiting from the plant divided by the fresh feed flow rate plus the catalyst flow rate) and the process conversion do not change with respect to the comparative example 1 being only a phase separation of the purge stream. The results are reported in Table 1.

Example 2

Example 1 is repeated also adding the recycle of the clarified component.

The clarified component stream is recycled at the inlet of the hydroconversion reactor, maintaining unchanged the operating temperature of 426.8° C. in addition to the sizing of the entire hydroconversion system. The reactor pressure is always 160 bara, the flow rate of the catalyst (the same as the comparative example 1, molybdenum octoate) is 197.6 kg/h and the hydrogen flow rate is 6.4 t/h.

The clarified component stream reacts by increasing the yields of the products with a boiling point lower than 500° C. In addition to the operating temperature, the THFi variable is set in the purge stream, which ensures that the amount of purge to be treated to the settling unit raises, increasing the yield in Cake. In this example only the cake is exited at the battery limits being the clarified component completely recycled to the hydroconversion unit.

The conversion of example 2, applying Equation 2, being inserted the static settling unit increases to 97.2%.

The results are reported in Table 1.

TABLE 1 comparison of different examples at constant process temperature and THFi in the purge, varies the capacity of the plant.

|  | Comparative Example | Example 1 | Example 2 |
|---|---|---|---|
| Inserted static settler | no | yes | yes |
| Clarified component recycle | no | no | yes |
| T reaction, ° C. | 426.8 | 426.8 | 426.8 |
| Fresh feed, t/h | 160.2 | 160.2 | 148.6 |
| Solid, weight | 8 | 8 | 8 |
| Yields, % wt |  |  |  |
| Consumption $H_2$ | −2.4 | −2.4 | −2.6 |
| $H_2S$ | 4.2 | 4.2 | 4.2 |
| $NH_3$ | 0.2 | 0.2 | 0.2 |
| C1 | 1.8 | 1.8 | 2.0 |
| C2 | 1.7 | 1.7 | 1.8 |
| C3 | 1.8 | 1.8 | 2.0 |
| C4 | 2.9 | 2.9 | 3.0 |
| C5-170 | 9.4 | 9.4 | 9.9 |
| 170-350 | 30.1 | 30.1 | 31.1 |
| 350-450 | 29.8 | 29.8 | 31.3 |
| 450-500 | 10.6 | 10.6 | 11.0 |
| 500+ | 3.3 | 3.3 | 3.3 |
| Purge | 6.8 | 0.0 | 0.0 |
| Clarified component | 0.0 | 4.3 | 0.0 |
| Cake | 0.0 | 2.5 | 2.8 |
| Conversion, % wt | 93.2 | 93.2 | 97.2 |

The hydrogen consumption is calculated as the ratio between the difference of the hydrogen kg/h in the products minus the hydrogen kg/h in the reactants divided by the sum of the flow rates of fresh feed and catalyst. The product yields in the cuts are calculated as kg/h of each cut exiting from the plant divided by the flow rate of fresh feed plus the flow rate of catalyst. The sum of the yields equals 100 plus the hydrogen consumption.

Example 3

Starting from Example 2, the temperature of the hydroconversion reactor is varied from 426.8° C. to 428.6° C. The reactor pressure is always 160 bara. The purge stream exiting from the hydroconversion section is sent to the settling unit, there is a production of clarified component which is recycled to the hydroconversion section and cake which is sent to the battery limits.

Table 2 shows Example 2 and compares it with Example 3 in which it is shown that by recycling the clarified component to the hydroconversion reactor the process conversion can be maintained by increasing the temperature from 426.8° C. to 428.6° C. restoring the capacity of the plant at that present in the comparative example 1 without having to re-size the entire plant. The hydrogen flow rate of this new case is 6.9 t/h, while the catalyst flow rate is 218.3 kg/h.

TABLE 2

Comparison of different cases with constant plant capacity and THFi in the purge, varying process temperature.

|  | Example 2 | Example 3 |
|---|---|---|
| Inserted static settler | yes | yes |
| Clarified component recycle | yes | yes |
| T reaction, ° C. | 426.8 | 428.6 |
| Fresh feed, t/h | 148.6 | 160.2 |
| Solid, % wt | 8 | 8 |
| Yields, % wt |  |  |
| Consumption H2 | −2.6 | −2.6 |
| $H_2S$ | 4.2 | 4.2 |
| $NH_3$ | 0.2 | 0.2 |
| C1 | 2.0 | 2.0 |
| C2 | 1.8 | 1.8 |
| C3 | 2.0 | 2.0 |
| C4 | 3.0 | 3.0 |
| C5-170 | 9.9 | 9.9 |
| 170-350 | 31.1 | 31.3 |
| 350-450 | 31.3 | 31.3 |
| 450-500 | 11.0 | 10.9 |
| 500+ | 3.3 | 3.2 |
| Purge EST | 0.0 | 0.0 |
| Clarified component | 0.0 | 0.0 |
| Cake | 2.8 | 2.8 |
| Conversion, % wt | 97.2 | 97.2 |

Example 4

Example 3 is taken again for this example. The feed to the plant is maintained constant and equal to 160.2 t/h and the THFi concentration in the purge is reduced starting from the conditions of Example 3 (8%), up to a value of 4%. Reducing the amount of THFi present in the purge means, operationally, increasing the amount of purge exiting from the plant, extracting a larger amount from the hydroconversion unit. The reactor pressure is always 160 bara, the reactor temperature is 426.6° C., the catalyst flow rate is 410.1 kg/h, while the hydrogen flow rate is 6.5 t/h.

Example 5

Example 3 is taken again for this example. The feed to the plant is maintained constant and equal to 160.2 t/h and the THFi concentration in the recycle is increased starting from the conditions of Example 3 (8%), up to a value of 12%. Increasing the amount of THFi present in the purge means, operationally, decreasing the amount of purge exiting from the plant, leaving a larger amount of THFi inside the hydroconversion plant. The reactor pressure is always 160 bara, the reactor temperature is 429.8° C., the catalyst flow rate is 150.1 kg/h, while the hydrogen flow rate is 7.1 t/h.

Table 3 shows the examples 3, 4 and 5 where the plant capacity is maintained fixed, the THFi content in the recycle is changed, that is the amount of purge sent to the static settling unit. This implies a change in the amount of recyclable clarified component. Even in these conditions, process conversions are still higher than the comparative example.

TABLE 3

Comparison of different examples with constant plant capacity, varying process temperature and THFi concentration in the purge.

|  | Example 3 | Example 4 | Example 5 |
|---|---|---|---|
| Static settler | yes | yes | yes |
| Clarified component recycle | yes | yes | yes |
| T reaction, ° C. | 428.6 | 426.6 | 429.8 |
| Fresh feed, t/h | 160.2 | 160.2 | 160.2 |
| Solid, % wt | 8 | 4 | 12 |
| Yields, % wt |  |  |  |
| Consumption $H_2$ | −2.6 | −2.5 | −2.7 |
| $H_2S$ | 4.2 | 4.2 | 4.3 |
| $NH_3$ | 0.2 | 0.2 | 0.2 |
| C1 | 2.0 | 1.8 | 2.0 |
| C2 | 1.8 | 1.7 | 1.9 |
| C3 | 2.0 | 1.9 | 2.0 |
| C4 | 3.0 | 2.9 | 3.0 |
| C5-170 | 9.9 | 9.6 | 10.1 |
| 170-350 | 31.3 | 30.5 | 31.7 |
| 350-450 | 31.3 | 30.2 | 31.9 |
| 450-500 | 10.9 | 11.1 | 10.6 |
| 500+ | 3.2 | 3.6 | 2.9 |
| Purge EST | 0.0 | 0 | 0.0 |
| Clarified component | 0.0 | 0 | 0.0 |
| Cake | 2.8 | 4.8 | 2.1 |
| Conversion, % wt | 97.2 | 95.2 | 97.9 |

The examples cover therefore different cases, wherein an increase in process conversion from 93% to 98% with respect to the comparative one is demonstrated; by introducing the static settling unit downstream of the hydroconversion process to treat the entire purge stream and by recycling the entire clarified component stream to the hydroconversion reactor in % between 3-10% wt (clarified component/fresh feed, %).

The illustrated examples show the great advantage obtainable with the present disclosure, which is that of reducing the stream to be sent to the battery limits, obtaining a product by static settling of the purge, which is convertible, recycling it to the hydroconversion section. By applying the settling technology to the purge stream of the hydroconversion section, the potential of the plant is not affected by the introduction of the static settler (see comparison between comparative example 1 and example 1). If, on the other hand, it is chosen to recycle the clarified component stream, the conversion also increases as only the Cake is sent to the battery limits, but at the cost of a reduction in potential (see comparison between examples 1 and 2). The potential can be easily recovered by acting on the operating conditions of the reactor, slightly increasing the temperature (comparison of examples 2 and 3). Finally, with the same plant potential, using different THFi concentrations in the recycle, or by varying the amount of purge sent to the settler and therefore the amount of recycled clarified component to the hydroconversion section, conversions are always greater than in the comparative case.

The invention claimed is:

1. A process for the hydroconversion of heavy oil products which comprises the following steps:
   Supplying to a slurry-phase hydroconversion section a Molybdenum-containing catalyst precursor, heavy oil products and a hydrogen-containing stream;
   Conducting a hydroconversion reaction producing a reaction effluent which is subsequently separated at high pressure and high temperature into a vapour phase and a slurry phase;
   Subsequently sending the separated vapour phase to a gas treatment section with the function of separating a liquid fraction from the hydrogen-containing gas;
   Subsequently sending the slurry phase to a separation section which has the function of separating the Vacuum Gas Oil (VGO), Heavy Vacuum Gas Oil (HVGO), Light Vacuum Gas Oil (LVGO), Atmospheric Gas Oil (AGO), from a stream of heavy organic products which contains asphaltenes, unconverted feed, catalyst and solid formed during the hydroconversion reaction;
   Recycling a part of said heavy organic products to the reaction section and forming a purge stream with the remainder;
   Heating said purge stream at a temperature greater than or equal to 185° C. and not above 220° C. and, subsequently;
   Subjecting said heated purge to settling by lowering the temperature in a progressive and controlled manner up to the minimum temperature of 100° C., without shaking the purge, so as to form a light phase, called clarified component, and a heavy phase, called cake, as a function of density;
   Recycling the clarified component to the slurry-phase hydroconversion section.

2. The process for the hydroconversion of heavy oil products according to claim 1, wherein the slurry-phase hydroconversion reactor is a bubble reactor.

3. The process for the hydroconversion of heavy oil products according to claim 1, wherein the reaction takes place in one or more hydroconversion reactors placed in parallel and similarly the effluent separation takes place in one or more high pressure and temperature separators placed in parallel.

4. The process for the hydroconversion of heavy oil products according to claim 1, wherein the vapour treatment section comprises heat exchangers alternated with a washing column (VGO), a high pressure and medium temperature separator, a high pressure and low temperature separator.

5. The process for the hydroconversion of heavy oil products according to claim 1, wherein said liquid separation section comprises a high temperature and low pressure separator which works as an accumulator; a pre-flash column, possibly a stripper to separate the lights, and lastly a vacuum distillation column to recover the VGO fraction, the LVGO fraction, the HVGO fraction, the Wash Oil and the vacuum Residue.

6. The process for the hydroconversion of heavy oil products according to claim 1, wherein the purge is heated at a temperature comprised between 185° C.-220° C.

7. The process for the hydroconversion of heavy oil products according to claim 6, wherein the purge is heated at a temperature comprised between 200° C. and 220° C.

8. The process according to claim 1, wherein the heated purge is cooled at a temperature which varies in the range comprised between 100° C. and 170° C.

9. A method according to claim 8, wherein the purge is cooled at a temperature comprised between 100° C. and 160° C.

10. The process for the hydroconversion of heavy oil products according to claim 1, wherein the weight ratio of recycled clarified component and fresh feed varies in the range from 2% to 13%.

11. The process for the hydroconversion of heavy oil products according to claim 10, wherein the weight ratio of recycled clarified component and fresh feed varies in the range from 3% to 10% by weight.

12. The process for the hydroconversion of heavy oil products according to claim 1, wherein the time required for the formation of a heavy phase or cake varies from 15 minutes to 2 hours.

13. The process for the hydroconversion of heavy oil products according to claim 12, wherein the time required for the formation of a heavy phase or cake varies from 20 minutes to 1 hour.

14. The process for the hydroconversion of heavy oil products according to claim 1, wherein the settling speed is comprised between 85 mm/hour and 300 mm/hour.

15. The process for the hydroconversion of heavy oil products according to claim 1, wherein the catalyst precursor is a solution of Mo-octoate (2-ethyl hexanoate) in 2-ethyl-exanoic acid, containing 15.5% by weight of Mo.

16. The process for the hydroconversion of heavy oil products according to claim 1, wherein the hydroconversion reactors and the high pressure and temperature separators operate in a temperature range comprised between 420° C. and 440° C., at a pressure comprised between 155 atm and 160 atm.

17. The process according to claim 1, wherein the controlled temperature lowering takes place:
   by using an adequately sized and thermostated tank, or
   by mixing a hot stream to be decanted with a cold stream, considering the appropriate thermal balance of the process to calculate the flow rates thereof.

* * * * *